5 Sheets—Sheet 2.
M. LONG.
TELLURIAN.
No. 88,187.  Patented Mar. 23, 1869.
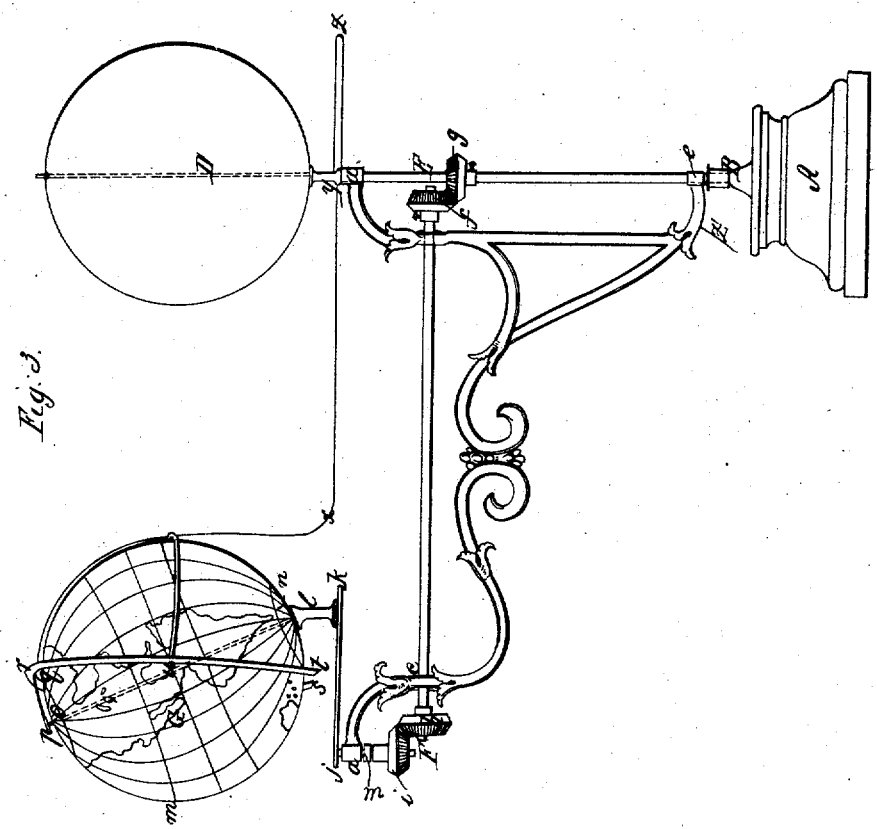
Witnesses;
Chs Wehle
Chas Goldzier
Inventor;
Marshal Long
H Wehle
attorney

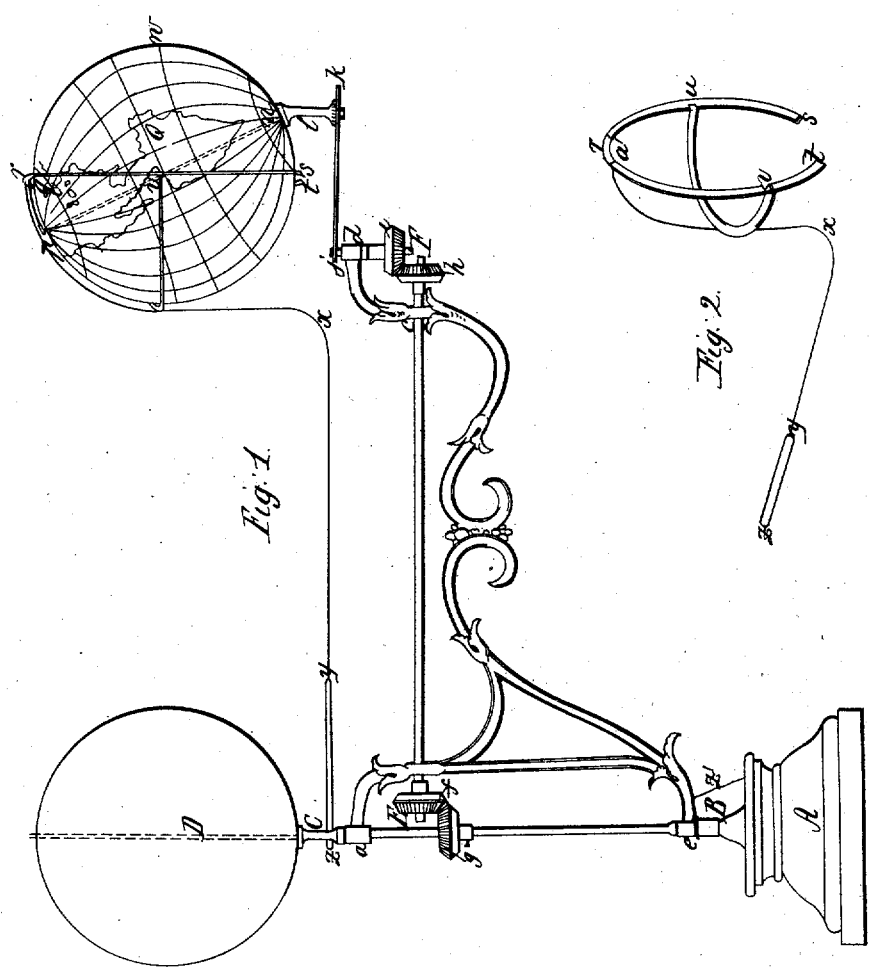

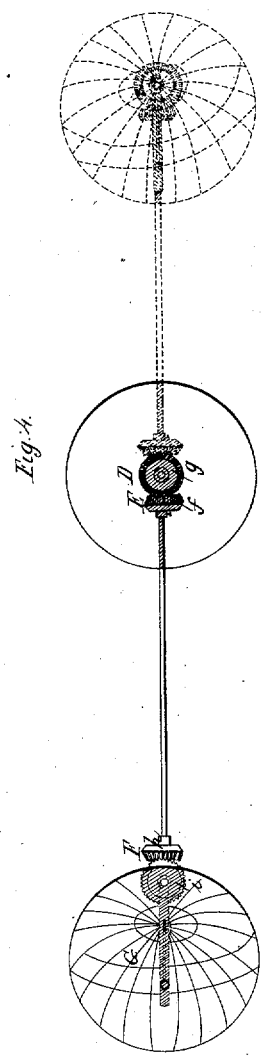

5 Sheets—Sheet 4.
M. LONG.
TELLURIAN.
No. 88,187. Patented Mar. 23. 1869.
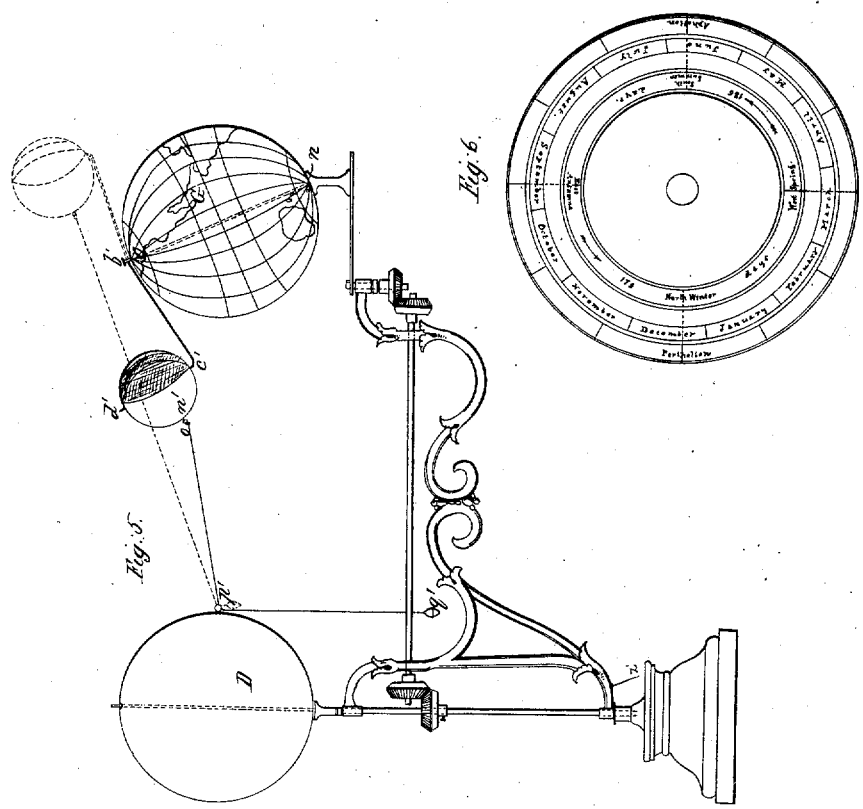
Witnesses;
Chs. Weree
Chas. Goldzier
Inventor;
Marshal Long
by H. Wehle
Attorney 5 Sheets—Sheet 5.
M. LONG.
TELLURIAN.
No. 88,187.        Patented Mar. 23, 1869.
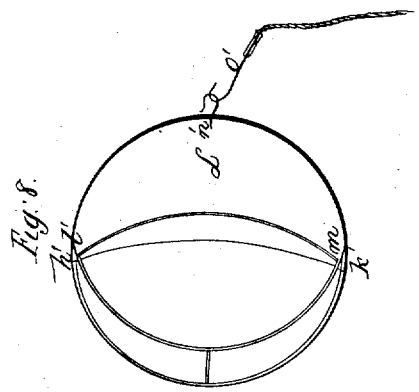
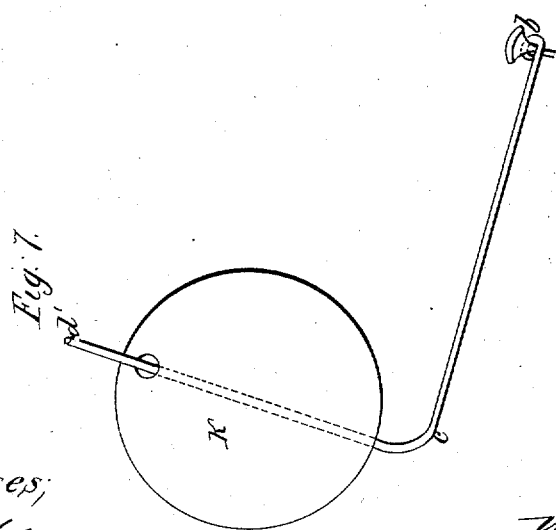
Witnesses;
Chs. Wehle
Chas Goldzier
Inventor;
Marshal Long
by H Wehle
Attorney

MARSHAL LONG, OF NEW YORK, N. Y.

Letters Patent No. 88,187, dated March 23, 1869.

IMPROVEMENT IN TELLURIUMS.

The Schedule referred to in these Letters Patent and making part of the same.

*To all whom it may concern:*

Be it known that I, MARSHAL LONG, of the city of New York, have invented a new and improved Tellurium; and I do hereby declare the following to be a full, clear, and exact description of my said invention, reference being had to the accompanying drawings, forming a part of this specification.

The nature of my invention consists in constructing an apparatus illustrating the position of the earth, with the inclination of its axis, its revolution around the sun, and the position of the moon, its changing faces, and varying times of rising.

In the annexed drawing—

Figure I represents a front view of the apparatus, when used to illustrate the movements of the earth.

Figure II is a detail drawing, showing the mechanical arrangement of the vertical belt $r\ s\ t$, forming the dividing line between the illuminated and the dark hemisphere, and the semi-belt $u\ v$, representing the plane of the earth's ecliptic, and the wire, $r\ x\ y\ z$.

Figure III shows the apparatus, as represented in Fig. I, with the position of the earth varied.

Figure IV is a top view of the apparatus, and shows the motion of the earth around the sun.

Figure V represents the apparatus with the moon attached, and shows the motion of the moon around the earth.

Figure VI is a representation of the plane of the earth's ecliptic and zodiac.

Figures VII and VIII are detail drawings, showing the parts out of which the ball representing the moon is composed.

In the centre of a base, or socket, A, a vertical pole, B C, is erected.

A gilt ball, D, representing the sun, is affixed to the upper end of the pole.

Around the vertical pole B C swings a bracket, $a\ b\ c\ d\ e$, which is attached to it by the two bearings $a$, at the upper end, and $e$, near the base.

This bracket supports the horizontal shaft E F, which revolves in the rings $b$ and $c$ of the said bracket.

This shaft is provided, on both ends, with bevel-wheels $f\ h$.

The bevel-wheel $f$ runs on the bevel-wheel $g$, which is screwed to the vertical pole B C.

The bevel-wheel $h$ imparts motion to the bevel-wheel $i$, which is affixed to the spindle $m$, held in the bearing $d$ of the bracket $a\ b\ c\ d\ e$.

To the upper end of the spindle $m$, the shank $j\ k$ is affixed.

A vertical pivot, $l$, is riveted in the shank $j\ k$, from which a wire, shown in the dotted line $n\ o$, extends, with an inclination of twenty-three and one-half degrees from a perpendicular, toward the plane of the orbit.

The wire $n\ o$ represents the axis of the earth, and the ball G, representing the earth, is set over this wire, and revolves around it.

Attached to the axis $n\ o$ is a small arm, $p\ q$, which ends in the small pivot $q$. On this pivot the hole $a'$, in belt $r\ s\ t$, Fig. II, fits, and the said vertical belt revolves on the pivot $q$.

The vertical belt $r\ s\ t$ (a segment of which is, for mechanical convenience, cut out,) represents the dividing line between the illuminated and the dark hemisphere, the hemisphere facing the sun being, of course, illuminated, and the hemisphere beyond the belt $r\ s\ t$, dark.

The horizontal semi-belt $u\ v$, completed to a circle by the dotted lines $v\ w$, represents the plane of the ecliptic.

The revolution of the vertical belt $r\ s\ t$ on the pivot $q$, is regulated by the wire $r\ x\ y\ z$. This wire is attached to the vertical belt $r\ s\ t$, and the horizontal semi-belt $u\ v$, as shown in Fig. II.

The fork $y\ z$, on the end of said wire, slides back and forward on the vertical pole B C, as the revolution of the earth G around the sun D requires.

Fig. VI represents the division of the zodiac. It is drawn on the plane of the socket A.

The hand Z' is attached to the bracket $a\ b\ c\ d\ e$, and points on the figures of the zodiac, denoting the periods of the year.

The apparatus, as far as described, Figs. I, II, III, IV, and VI, is used to illustrate the motion of the earth around the sun; and I will now describe the operation of the apparatus when used for the above purpose.

The instructors who are to use my apparatus, are assumed to know the relative position, the actual size, and the other properties of the heavenly bodies represented in my apparatus, and I deem it unnecessary to state the particular in which the apparatus does not represent the actual character of said heavenly bodies, but wish to state, that with my apparatus, I intend merely to explain the movements, and the effects of the movements of the said heavenly bodies, but not their proportionate size, distance, and other properties.

The relative position of the earth to the sun, shown in Fig. I, corresponds to the summer solstice.

Now, if the bracket $a\ b\ c\ d\ e$ is moved toward the right, (in imitation of the motion of the earth around the sun,) the bevel-wheel $f$, by means of the bevel-wheel $g$, imparts rotating motion to the shaft E F; the bevel-wheel $h$, on the end of the shaft E F, imparts its motion, by means of the bevel-wheel $i$, to the spindle $m$, and the arm $j\ k$, being attached to the spindle $m$, will move in a direction contrary to the motion of the bracket $a\ b\ c\ d\ e$ to the left, thereby diminishing the distance of the earth from the sun, in about the same proportion as the distance of the sun from the earth decreases during the advance of the earth to the winter solstice.

Continuing the motion of the bracket in the same direction, until the semicircle is completed, and the earth has reached the winter solstice, the position of the apparatus will be as indicated by the red lines in Fig. IV.

This movement, continued to the summer solstice, completes the ecliptic orbit of the earth.

The hand $Z'$ will indicate on the zodiac, from the autumnal equinox to the vernal equinox, one hundred and seventy-nine days only, and one hundred and eighty-six days through the other half of the orbit.

By means of the apparatus as represented in Figs. I, III, and IV, the instructor is enabled to explain, among others, the following phenomena:

First, the semi-annual lengths of the days and nights at the poles.

Second, the effect of the inclination of the axis of the earth, in causing the difference between apparent and true time, is shown by the wire $r\ x\ y$, on comparing the position of the earth, in its summer and winter solstice, with that of it in its autumnal or vernal equinox.

The apparatus may be arranged to illustrate the revolution of the moon around the earth.

For this purpose, the mechanical arrangement shown in Fig. II, and the arm $p\ q$, are removed from the apparatus.

A pin, $b'$, Fig. V, is inserted at the north pole of the globe G.

From this pin, a wire, $b'\ c'$, extends in a slightly-rising direction.

At $C'$ the wire is bent, to form the axis $c'\ d'$ of the ball K, Fig. VII, covered with the metal cap L, representing the moon.

The metal cap L covers a hemisphere of the ball K. It is secured to the ball by means of the two wires $h'\ k'$ and $l'\ m'$. It does not cleave to the ball, but moves around it in all directions.

A small hole, $n'$, is fixed in the centre of the said cap.

An India-rubber thread, $o'\ p'\ q'$, on one end of which is the weight $q'$, on the other end of which is the hook $o'$, is looped through the small staple $p'$, fastened in the ball D. The hook $o'$ is then locked in the hock $n'$ of the metal cap.

By this means the weight $q'$ exerts a slight strain on metal cap L.

When the ball K is moved around the earth, the strain on the hook $o'$, by means of the elastic thread, will keep the metal cap L always facing the sun, thus illustrating the reflection of the rays of the sun on the moon.

In showing the movement of the moon, no reference is taken to the revolution of the earth around the sun, but the earth is assumed as revolving only around its own axis.

The drawing, Fig. V, shows the earth in summer solstice, and the moon (dark lines) in inferior conjunction. It turns to our planet its dark hemisphere; it is in the position of new moon. Moving the shank $b'\ c'$ to the right, the moon gradually presents parts of its illuminated surface to the earth.

When the shank $b'\ c'$ has completed a half circle, the moon arrives in apposition. Then it represents full moon, as shown in the red lines of the drawings, Fig. V.

Thus, having shown the different faces while increasing, continuing the motion of the shank $b'\ c'$, the moon gradually presents less and less of its illuminated surface to the earth, till it arrives again in conjunction, thus having shown its various faces while waning.

From what has been shown, it can easily be explained, by the instructor, how the moon, after coming in apposition, rises fifty minutes later every night.

The instructor is also enabled to show, by this figure of the apparatus, that, in fact, the same hemisphere of the moon is turned toward the earth all the time.

Having described my apparatus,

I claim as my invention, and desire to secure by Letters Patent of the United States—

1. The mechanical arrangement of the wire $r\ x\ y\ z$, the vertical belt $r\ s\ t$, and the horizontal semi-belt $u\ v$, with the revolving globe G, and stationary globe D, substantially as herein described, and for the purpose set forth.

2. The combination of the bracket $a\ b\ c\ d\ e$ with the vertical pole B C, the horizontal shaft E F, the gear-wheels $f,\ g,\ h,\ i$, the spindle $m$, the arm $j\ k$, the pivot $l$, the mechanical arrangement of the wire $r\ x\ y\ z$, the vertical belt $r\ s\ t$, and the horizontal semi-belt $u\ v$, and the globes D and G, substantially as herein described, and for the purpose set forth.

3. The combination of the mechanical devices above mentioned with the wire $b'\ c'\ d'$, the dark globe K, the metal cap L, the elastic thread $o'\ p'\ q'$, and the weight $q'$, substantially as herein described, and for the purpose set forth.

MARSHAL LONG.

Witnesses:
HENRY WEHLE,
CHS. WEHLE.